United States Patent Office 2,816,891
Patented Dec. 17, 1957

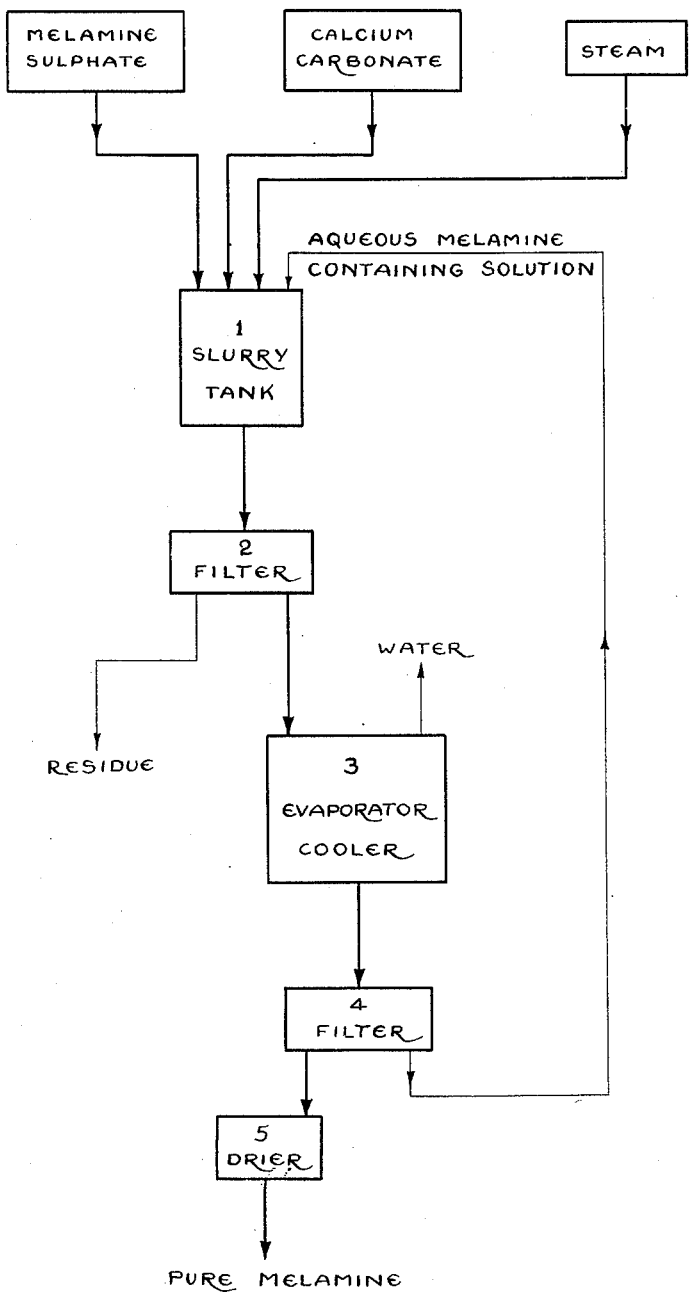

2,816,891

PROCESS FOR THE PRODUCTION OF MELAMINE FROM MELAMINE SULPHATE

Harry Edward Jackson, Rossland, British Columbia, Canada, assignor to The Consolidated Mining and Smelting Company of Canada Limited, Montreal, Canada, a company of Canada Application February 2, 1956, Serial No. 563,120

7 Claims. (Cl. 260—249.7)

This invention relates to a method of producing pure melamine from melamine sulphate.

Melamine is a white crystalline solid having a melting temperature of about 354° C. It has the empirical formula $C_3N_6H_6$.

Melamine sulphate may be produced as an intermediate product in the manufacture of melamine, for example, by processes involving sulphur dioxide or sulphamate or sulphate compounds, particularly during purification steps subsequent to formation of the initial melamine product.

The crude melamine sulphate may contain impurities such as sulphur, guanidine sulphamate, ammonium sulphate, heterocyclic compounds such as ammelide and ammeline and melamine condensation products such as melem, melam and melon. Guanidine sulphamate and ammonium sulphate can be separated from the crude melamine sulphate by leaching with water, but the less soluble and insoluble impurities are much more difficult to remove. Following the separation of soluble compounds such as guanidine sulphamate and ammonium sulphate, the residual melamine sulphate mixture may contain sulphur, ammeline, ammelide, and various condensation products. All these impurities must be removed if contamination of the final melamine product is to be avoided.

A principal object of this invention is to provide a simple, effective method for producing pure melamine from such a mixture.

Melamine sulphate can be converted to melamine by dissolving the melamine sulphate in an aqueous sodium carbonate solution and boiling the solution for a period of time sufficient to convert the melamine sulphate to melamine with the formation of sodium sulphate. The solution is then filtered to separate insoluble impurities and thereafter is cooled whereby melamine is precipitated therefrom by crystallization.

This procedure for converting melamine sulphate to melamine has several important disadvantages. It does not entirely remove impurities such as ammeline and sulphur which usually are present in the crude melamine sulphate and which are soluble, at least to some extent, in the hot sodium carbonate solution. Therefore, it is necessary to remove such impurities from the crude melamine sulphate in a preliminary treatment, such as by dissolving the melamine sulphate in hot water in which it is soluble to a limited extent. The hot aqueous melamine sulphate solution is then filtered to remove the insoluble impurities and then is cooled to precipitate melamine sulphate by crystallization. The melamine sulphate is then treated with boiling sodium carbonate solution to convert it to melamine. This method of separating impurities from melamine sulphate prior to conversion of melamine sulphate to melamine by the sodium carbonate process suffers the important economic disadvantage of the high capital and operating costs of the equipment required for heating, filtering, evaporating and cooling large volumes of water and crystallizing and separating solids therefrom.

I have found that the important problem of separating impurities from melamine sulphate and of converting melamine sulphate to melamine can be overcome by treating the melamine sulphate in an aqueous slurry containing calcium carbonate. Barium carbonate and strontium carbonate can be used instead of calcium carbonate but they are so much more expensive that they would not normally be economically comparable.

The method of the present invention involves, in general, the steps of dispersing crude melamine sulphate in water or an aqueous melamine solution to form a slurry. Sufficient liquid is provided to retain all the melamine, as it is formed, in solution at a temperature of about 90° C. The slurry is formed at a temperature of from about 10° C. to about 40° C., preferably about 30° C. Calcium carbonate, or barium or strontium carbonate if desired, is added to the slurry which is then heated to boiling, and maintained at that temperature with agitation for a period of time sufficient to convert all the melamine sulphate to melamine. The hot solution is then filtered to separate undissolved and precipitated material and then is cooled to precipitate melamine by crystallization. Melamine crystals can be separated from the melamine mother liquor, for example, by filtration or by centrifuging and melamine containing mother liquor can be recycled as the aqueous solution employed to form the liquid phase of the crude melamine sulphate slurry.

This improved method has the important advantage that impurities associated with the crude melamine sulphate are separated and melamine sulphate is converted to melamine in a single step; only a relatively small volume of solution is required with attendant important savings in heat consumption and capital and operating costs of equipment. Also, calcium carbonate in the form of limerock is readily available and is relatively inexpensive.

The present method can be operated as a batch process or as a continuous process. Thus, it is readily adapted for inclusion as a stage in an overall process for the production of melamine from starting materials to finished product.

The conversion of melamine sulphate to melamine by the present method may be represented by the following equation:

$$(C_3N_6H_6)_2 \cdot H_2SO_4 + CaCO_3 \rightarrow 2C_3N_6H_6 + CaSO_4 + CO_2 + H_2O$$

The decomposition of the carbonate compound employed, for example calcium carbonate, is, of course, expedited by conducting this reaction at a temperature above atmospheric temperature.

An important consideration in the operation of the present method is the solubility of each of the various compounds involved in the process. The solubility of melamine sulphate in hot water is relatively low but it is significant; the solubility of melamine is substantially higher than melamine sulphate in both cold and hot water solutions. Therefore, it is not necessary to provide sufficient water to dissolve all the melamine sulphate. It is sufficient to provide only a small excess of water over that required to retain the melamine in solution as it is formed during the course of the reaction, and during the filtering step. This results in the heating and treatment of a solution only about one-quarter of the volume of that which would be required if it was necessary to dissolve all the melamine sulphate initially.

The solubility of calcium carbonate in hot water is low and any excess over the amount necessary for reaction with melamine sulphate remains as an insoluble residue and can be separated, together with sulphur and compounds such as ammeline and ammelide and melamine condensation products which also are insoluble in the solution, from the hot solution in the hot filtration step. As the solubility of calcium sulphate varies inversely with the temperature, that is, as calcium sulphate is more soluble in cold water than in hot water, any calcium sulphate which dissolves in the hot solution remains dissolved in the solution when the solution subsequently is cooled. There is no likelihood, therefore, of contaminating the melamine product with calcium sulphate.

Barium sulphate and strontium sulphate do not exhibit the inverse solubility ratio with temperature which is shown by calcium sulphate and for this reason the barium and strontium compounds are less desirable, aside from their cost. However, these sulphates are very insoluble and do not contaminate the product to any appreciable extent.

The operation of the method of the present invention is described hereinafter, reference being made to the accompanying flow sheet drawing.

The operation of the method is very simple. When melamine sulphate is dispersed in water or in an aqueous solution unsaturated in respect of melamine sulphate to form a slurry and the mixture is heated, such as in vessel 1, some melamine sulphate is dissolved. When calcium carbonate is added to the slurry and the mixture is heated, calcium carbonate and melamine sulphate react with the evolution of carbon dioxide to form calcium sulphate, melamine and water. The calcium sulphate precipitates as it is formed and the melamine remains in solution due to its high solubility relative to the solubility of melamine sulphate. The dissolving of melamine sulphate in the solution and its reaction with calcium carbonate with resultant precipitation of calcium sulphate and conversion of melamine sulphate to melamine continue until substantially all the melamine sulphate has been converted to melamine. Calcium carbonate is added, of course, in amount sufficient to provide at least a slight excess over the stoichiometric amount required for reaction with the melamine sulphate to ensure substantially complete conversion of melamine sulphate to melamine.

The hot aqueous slurry comprised of precipitated calcium sulphate, unreacted calcium carbonate and undissolved impurities and aqueous solution containing dissolved melamine is filtered in filter 2 while hot thereby separating the insoluble residue from the melamine, which is retained dissolved in the filtrate. The residue comprises excess calcium carbonate, calcium sulphate, sulphur, ammeline, ammelide and possibly other heterocyclic compounds, melamine condensation products, and possibly other insoluble compounds such as metal hydroxides or carbonates. The residue can be discarded. The hot filtrate or melamine solution is cooled, for example in a vacuum cooler 3, to a temperature below the saturation temperature of the solution whereby melamine substantially free from impurities is precipitated by crystallization. Any calcium sulphate dissolved in the hot solution remains in the solution on cooling due to the inverse variation of the solubility of calcium sulphate with temperature.

The precipitated melamine is in fine, crystalline form and is of high purity. It can be separated from the cooled solution, for example, by filtration in a filter 4, or by centrifuging, and dried in a drier 5 and prepared for marketing.

The solution is saturated or nearly saturated with melamine at the temperature at which it leaves the crystallizing step. Loss of melamine is avoided by recycling this solution to the first step of the process to form the initial slurry with melamine sulphate.

The following example illustrates the operation of the invention:

*Example*

A slurry is formed by agitating about 4.5 pounds of crude melamine sulphate and about 2 pounds of calcium carbonate, in the form of finely ground limerock, with about 45 pounds of cycling aqueous solution containing about 0.25 pound melamine. The mixture is boiled with active agitation for about one hour. Evolution of carbon dioxide is fairly rapid. A small amount of a conventional foam depressor can be added if severe foaming occurs.

The resultant slurry is filtered hot and the cake is washed and discarded. In the present instance, the cake, containing calcium sulphate, about 0.5 pound of excess calcium carbonate, some sulphur and a little ammeline and other materials, is at present worthless, but the cake can be treated for the separate recovery of one or more of its components if desired.

The filtrate contains the melamine and is at a temperature of about 95° C. It is cooled, such as by vacuum cooling, to about 10° C., thereby precipitating most of the melamine as fine, white crystals. The crystals are separated from the solution by filtration and dried, producing about 3 pounds of melamine.

The cooled filtrate after separation of the melamine is recycled to the initial step of the process.

It will be understood, of course, that modifications can be made in the preferred embodiment of the invention described herein without departing from the scope of the invention defined by the appended claims.

What I claim as new and desire to protect by United Patent of the United States is:

1. The method of producing melamine substantially free from impurities from melamine sulphate which comprises the steps of dispersing melamine sulphate in an aqueous medium of the group consisting of water and aqueous melamine solution to form a slurry, adding to the slurry an alkaline earth metal carbonate of the group consisting of calcium carbonate, barium carbonate and strontium carbonate to provide alkaline earth metal in at least the amount stoichiometrically equivalent to the sulphate content of the melamine sulphate, agitating and heating the resulting mixture for a period of time sufficient to convert melamine sulphate to melamine, separating solid residue from the hot solution, cooling the solution to a temperature below its saturation temperature in respect of melamine to precipitate melamine therefrom by crystallization, and separating melamine crystals from the solution.

2. The method of producing melamine according to claim 1 in which the water content of the aqueous medium is in excess of the amount necessary to retain all the melamine in solution as it is formed in the conversion of melamine sulphate to melamine but less than the amount required to retain in solution all the melamine sulphate in the slurry.

3. The method of producing melamine from melamine sulphate according to claim 1 in which the melamine sulphate-alkaline earth metal carbonate slurry is formed at a temperature of from about 10° C. to about 40° C. and the slurry is heated to its boiling temperature during the heating step.

4. The method of producing melamine substantially free from impurities from melamine sulphate which comprises the steps of dispersing melamine sulphate in an aqueous melamine solution to form a slurry containing dissolved melamine, adding to the slurry an alkaline earth metal carbonate of the group consisting of calcium carbonate, barium carbonate and strontium carbonate to provide alkaline earth metal in at least the amount stoichiometrically equivalent to the sulphate content of the melamine sulphate, agitating and heating the resulting mixture for a period of time sufficient to convert melamine sulphate to melamine, separating solid residue from the hot solution, cooling the solution to a temperature below its saturation temperature in respect of melamine to precipitate melamine therefrom by crystallization, separating melamine crystals from the solution, and re-cycling the last mentioned solution to the melamine sulphate slurry forming step of the method.

5. The method of producing melamine from melamine sulphate according to claim 4 in which the water content of the aqueous medium is in excess of the amount necessary to retain all the melamine in solution as it is formed in the conversion of melamine sulphate to melamine but less than the amount required to retain in solution all the melamine sulphate in the slurry.

6. The method of producing melamine from melamine sulphate according to claim 4 in which the melamine sulphate-alkaline earth metal carbonate slurry is formed at a temperature of from about 10° C. to about 40° C. and the slurry is heated to its boiling temperature during the heating step.

7. The method of producing melamine substantially free from impurities from melamine sulphate which comprises the steps of dispersing melamine sulphate in an aqueous melamine solution at a temperature within the range of from about 10° C. to 40° C., the water content of said solution being of sufficient volume to dissolve at about 90° C. the melamine stoichimetrically equivalent to the melamine content of the melamine sulphate, adding to the slurry calcium carbonate to provide calcium in at least the amount stoichiometrically equivalent to the sulphate content of the melamine sulphate, agitating and boiling the resulting slurry for a period of time sufficient to convert melamine sulphate to melamine, separating solid residue from the hot solution, cooling the solution to a temperature below its saturation temperature in respect of melamine to precipitate melamine therefrom by crystallization, separating crystallized melamine from the cooled solution, and re-cycling cooled solution to the slurry forming step of the method.

References Cited in the file of this patent

UNITED STATES PATENTS

| | | |
|---|---|---|
| 1,692,695 | Pope | Nov. 20, 1928 |
| 2,230,827 | Burns | Feb. 4, 1941 |

FOREIGN PATENTS

| | | |
|---|---|---|
| 817,819 | France | Sept. 11, 1937 |
| 817,895 | France | 1937 |